United States Patent [19]

Komurasaki

[11] Patent Number: 4,607,602

[45] Date of Patent: Aug. 26, 1986

[54] IGNITION TIMING CONTROL APPARATUS FOR INTERNAL COMBUSTION ENGINE

[75] Inventor: Satoshi Komurasaki, Himeji, Japan

[73] Assignee: Mitsubishi Denki Kabushiki Kaisha, Tokyo, Japan

[21] Appl. No.: 647,652

[22] Filed: Sep. 6, 1984

[30] Foreign Application Priority Data

Sep. 16, 1983 [JP] Japan .............................. 58-171469
Oct. 26, 1983 [JP] Japan .............................. 58-202084
Oct. 31, 1983 [JP] Japan .............................. 58-206468

[51] Int. Cl.⁴ ........................................... F02P 5/155
[52] U.S. Cl. .................................... 123/425; 123/418
[58] Field of Search ....................... 123/425, 435, 418

[56] References Cited

U.S. PATENT DOCUMENTS

| 4,111,035 | 9/1978 | West et al. .............................. 73/35 |
| 4,357,918 | 11/1982 | Asano .................................. 123/425 |
| 4,370,963 | 2/1983 | Iwata et al. ........................... 123/425 |
| 4,377,999 | 3/1983 | Komurasaki et al. .............. 123/425 |
| 4,382,429 | 5/1983 | Enoshima et al. .................. 123/425 |
| 4,485,626 | 12/1984 | Moriguchi et al. ................. 123/425 |
| 4,509,331 | 4/1985 | Hirabayashi ....................... 123/425 |
| 4,513,716 | 4/1985 | Haraguchi et al. ................. 123/425 |

Primary Examiner—Andrew M. Dolinar
Attorney, Agent, or Firm—Leydig, Voit & Mayer, Ltd.

[57] ABSTRACT

An ignition timing control apparatus for an internal combustion engine wherein the ignition timing of the engine is approached to the Minimum Advance for Best Torque in a partial load region of the engine, e.g. a rising supercharging region in a supercharging characteristic. When a predetermined rotating speed in the partial load region is detected by a rotating speed detector, the lagging angle of the ignition timing is provided but reduced smaller than that in the full load region where the rotating speed is above the predetermined speed. An intake pressure detector is also used for the detection of the partial load region. In response to the outputs of these detectors, a knocking signal and other signals are relatively changed in signal level so as to control the lagging angle of the ignition timing.

20 Claims, 14 Drawing Figures

IGNITION TIMING CONTROL APPARATUS FOR INTERNAL COMBUSTION ENGINE

BACKGROUND OF THE INVENTION

This invention relates to an ignition timing control apparatus for an internal combustion engine, and particularly, it relates to an apparatus for suppressing a knocking produced in an internal combustion engine.

In general, the efficiency of an internal combustion engine increases when its ignition timing is set near to a minimum advance for best torque (which will be hereinafter abbreviated as "MBT").

However, when the ignition timing of the engine excessively approaches the MBT, a knocking condition occurs, whereby the engine is damaged. Thus, an ignition timing control apparatus which detects knocking in the engine and which controls the ignition timing to suppress the knocking has been recently developed and employed.

Particularly in conventional engines having superchargers, the above-described ignition timing control apparatuses have been frequently mounted for the purpose of protecting the engine by preventing excessive knocking from occurring, increasing the power of the engine and for optimizing fuel consumption.

A conventional apparatus of this type will be specifically described with reference to the drawings.

FIG. 1 shows a conventional ignition timing control apparatus of this type. Only a signal component of frequencies corresponding to a knocking of an output of an acceleration sensor 1, mounted on an internal combustion engine, for detecting the vibration acceleration of the internal combustion engine is passed through a frequency filter 2, and a noise signal which disturbs the detection of the knocking signal in the output signal from the frequency filter 2 is interrupted by an analog gate 3. The analog gate 3 is controlled to be opened or closed by a gate timing controler 4 in response to the occurrence of the disturbing noises. The output signal of the analog gate 3 is fed to a noise level detector 5 for detecting the level of a mechanical vibration noise of the engine except for the knocking time. The output of the analog gate 3 and the output voltage of the noise level detector 5 are applied to a comparator 6, which compares both outputs, and outputs a knocking detection pulse depending on the magnitude of both input signals. The output from the comparator 6 is integrated by an integrator 7, which thus outputs an integrated voltage corresponding to the level of knocking. A phase shifter 8 displaces the phase of a reference ignition signal in response to the output signal from the integrator 7. A rotation signal generator 9 generates an ignition signal, corresponding to a predetermined ignition advance angle, which is applied to a waveform shaper 10, which, in turn, shapes the waveform of the ignition signal, and simultaneously controls the closing angle of an ignition coil 12. A switching circuit 11 interrupts or continues the energization of the ignition coil 12 in response to the output signal from the phase shifter 8. The output signal of the phase shifter 8 is also used for controlling the gate timing controller 4.

FIG. 2 shows a graphical diagram illustrating frequency vs. signal level characteristics of the output signal from the acceleration sensor 1. Here, a broken line curve A denotes the characteristics in a case where knocking does not occur, and a solid line curve B denotes the characteristics in a case where knocking does occur. The output signal from the acceleration sensor 1 includes a knock signal (a signal generated upon the occurrence of knocking), a mechanical noise of an engine, and various noise components carried on a signal transmission line such as an ignition noise, etc.

In comparing of the curve A with the curve B in FIG. 2, it is understood that the knocking signal has a defined distribution of specific frequencies. Various differences exist in the distribution due to difference in engines and/or differences in the mounting positions of the acceleration sensor 1. However, the main factor for the differences depends upon the presence or absence of knocking, and clear differences of the frequency distribution take place in accordance with the presence or absence of the knocking signal. Therefore, only frequency components of this knocking signal are passed to suppress the noise of other frequency components, thereby enabling a knock signal to be efficiently detected.

FIGS. 3 and 4 show the operating waveforms at various circuit points of the apparatus in FIG. 1, wherein FIG. 3 shows the various waveforms in a mode where no knocking occurs and FIG. 4 indicates the various waveforms in a mode where knocking takes place.

The operation of the conventional apparatus in FIG. 1 will now be described.

The rotation signal generated from the rotation signal generator 9 in response to the predetermined ignition timing characteristic due to the rotation of the engine is waveform-shaped to a switching pulse for providing a predetermined ignition angle by means of the waveform shaper 10 to drive the switching circuit 11 through the phase shifter 8, thereby interrupting or continuing the energization of the ignition coil 12. Thus, the engine is ignited and operated by the ignition voltage of the ignition coil 12 generated when the ignition coil 12 is de-energized. The vibration of the engine which takes place during the operation of the engine is detected by the acceleration sensor 1.

When no knocking occurs in the engine, the vibration of the engine due to knocking does not take place. However, the output signal of the acceleration sensor 1 contains a mechanical noise as shown in FIG. 3(a) due to other mechanical vibration or an ignition noise transmitted to a signal transmission line at an ignition time F. When the signal is passed through the frequency filter 2, the mechanical noise components of the signal are considerably suppressed as shown in FIG. 3(b), but since ignition noise components are high, the ignition noise components are passed through the frequency filter 2 in a high level. Thus, since the ignition noise is erroneously recognized as a knock signal in this state, the analog gate 3 closes its gate for a period $t_1$ from the ignition time by the output (FIG. 3(c)) from the gate timing controller 4 triggered by the output from the phase shifter 8 to thereby block the ignition noise. Therefore, the output from the analog gate 3 contains only the mechanical noise at a low level as shown by the waveform I in FIG. 3(d). On the other hand, the noise level detector 5 responds to the variation of the peak value of the output signal (I in FIG. 3(d)) from the analog gate 3. In this case, the noise level detector 5 has a characteristic capable of responding to the relatively slow variation of the peak value of an ordinary mechanical noise and so generates a D.C. current slightly higher than the peak value of the mechanical noise. This is shown by the waveform II in FIG. 3(d).

Since the output from the noise level detector 5 is larger than the mean peak value of the output signal from the analog gate 3, the comparator 6 which compares both signals does not produce any output as shown in FIG. 3(e), and the noise signal is eventually eliminated. Therefore, the output voltage from the integrator 7 is zero as shown in FIG. 3(f), and the phase shifting angle (the phase difference between the input and the output) by the phase shifter 8 accordingly becomes zero. Thus, since the output from the phase shifter 8 is not shifted in phase, the opening or closing phase of the switching circuit 11 thus driven, i.e., the energizing or de-energizing phase of the ignition coil 12 becomes in-phase with the reference ignition signal from the waveform shaper 10, and the ignition timing coincides with the reference ingition position.

When knocking occurs, the output of the acceleration sensor 1 includes a knock signal component in the vicinity of a delay time $t_2$ from the ignition time F as shown in FIG. 4(a), the frequency component of the output becomes the distribution as shown by the curve B in FIG. 2, and the signal passed through the frequency filter 2 and the analog gate 3 contains the mechanical noise largely superposed with the knock signal, as shown by the waveform I in FIG. 4(d). Since the rising portion of the knock signal among the signals passed through the analog gate 3 is abrupt as shown by the waveform I in FIG. 4(d), the rise of the output voltage of the noise level detector 5 is lagged or delayed in response to the knock signal. As a result, since the inputs from the analog gate 3 and the noise level detector 5 to the comparator 6 respectively become the waveforms I and II in FIG. 4(d), pulses as shown in FIG. 4(e) are generated at the output of the comparator 6. The integrator 7 integrates the pulses and generates an integrated voltage as shown in FIG. 4(f). Since the phase shifter 8 shifts in phase the output signal thereof and hence the reference ignition signal from the waveform shaper 10 shown in FIG. 4(h) in a direction for lagging the timing of the signal in response to the amplitude of the integrated voltage of the integrator 7, the phase of the output signal from the phase shifter 8 is lagged with respect to the reference ignition signal as shown in FIG. 4(g), and the switching circuit 11 drives the ignition coil 12 by this signal. Therefore, the ignition timing is lagged, and the knocking is suppressed. In this manner, the operating states shown in FIGS. 3 and 4 are repeated to provide an optimum ignition timing signal.

In U.S. Pat. No. 4,111,035, for the detection of the knock signal, a noise reference voltage is produced by the difference between the output of the band pass filter and the output of the low pass filter, and a comparator compares the output of the band pass filter with a reference voltage to detect the knock signal. In this case, the input of the low pass filter is obtained by the feedback output of the comparator.

An example of the supercharging characteristic of an internal combustion engine having a supercharger is shown in FIG. 5. In FIG. 5, the abscissa axis denotes the rotating speed of the engine, and the ordinate axis denotes the supercharging pressure of the engine.

In general, the supercharging pressure reaches a limited value P when the engine rotates at a speed faster than a rotating speed N (revolution per minute) as shown by the characteristic in FIG. 5, and also exhibits a rising characteristic in which the pressure does not reach the limited value P when the engine rotates at the speed equal to or slower than the rotating speed N. This rotating speed N is frequently set to approx. 2,500 r.p.m.

On the other hand, the engine is normally rotated in a practical rotating region of approx. 1,500 to 3,000 r.p.m. in the city driving mode, which is substantially in the rising region of the supercharging characteristic.

More particularly, the practical rotating range of the engine having a supercharger is in the rising region of the supercharging characteristic in FIG. 5 and hence in the rotating range where an increase in the output of the engine by the supercharger is low.

Since the delay in response by the supercharger is large in this rotating range, the rise of the rotating speed of the engine at the acceleration time is not abrupt, and the engine accordingly necessitates larger power. Therefore, the output of the supercharging characteristic in the rising region directly affects the acceleration performance of the engine.

In order to increase the power of an engine, it is preferred to set the ignition timing in the vicinity of the MBT, but if the ignition timing excessively approaches the MBT, knocking state occurs which may damage the engine. However, the ignition timing of the engine can be made to the MBT by setting the ignition timing during high speed rotation in a paractical rotation range as in FIG. 5, and the power of the engine can be increased by suitably designing the engine and the vehicle. In this case, a knocking thus occurred will not damage the engine and a decrease in an impression due to the knocking sound can be set to an allowable range.

SUMMARY OF THE INVENTION

This invention has been made in order to eliminate the disadvantages mentioned above, and has for its object to provide an ignition timing control apparatus capable of approaching the ignition timing to the MBT by reducing the controlled variable of lagging angle of the ignition timing in a partial load region where the supercharging voltage does not reach the limit value, thereby increasing the power of a practical rotation region, whereby the specific fuel consumption of an internal combustion engine is improved by the acceleration performance.

Accordingly, the present invention provides an ignition timing control apparatus for an internal combustion engine including a supercharger having an operating characteristic such that the supercharging pressure rises with increasing engine speed to a supercharged pressure limit and thereafter remains generally constant with increasing engine speed. The ignition timing control apparatus comprises an acceleration sensor for detecting the vibrating acceleration of the internal combustion engine; discriminating means for removing a noise signal component from the output of the acceleration sensor to discriminate a knocking signal component; generation means for generating reference ignition timing signals; phase shift means for phase shifting the phase of the reference ignition timing signals in response to the output of the discriminating means; switch means for switching the energization of an ignition coil in response to the output of the phase shift means; detector means coupled to the engine for monitoring a load condition indicative of the operating characteristic of the supercharger and generating a first signal in the rising portion of the supercharger operating characteristic and a second signal in the constant portion of the supercharger operating characteristic; and, control means for controlling the phase shift variable of the reference ignition timing signals in response to the signals generated by the detector means.

BRIEF DESCRIPTION OF THE DRAWINGS

In the drawings, the same symbols indicate the same or corresponding parts.

DETAILED DESCRIPTION OF THE PREFERRED EMBODIMENTS

Preferred embodiments of the present invention will be described in more detail with reference to the accompanying drawings.

Figure 1:
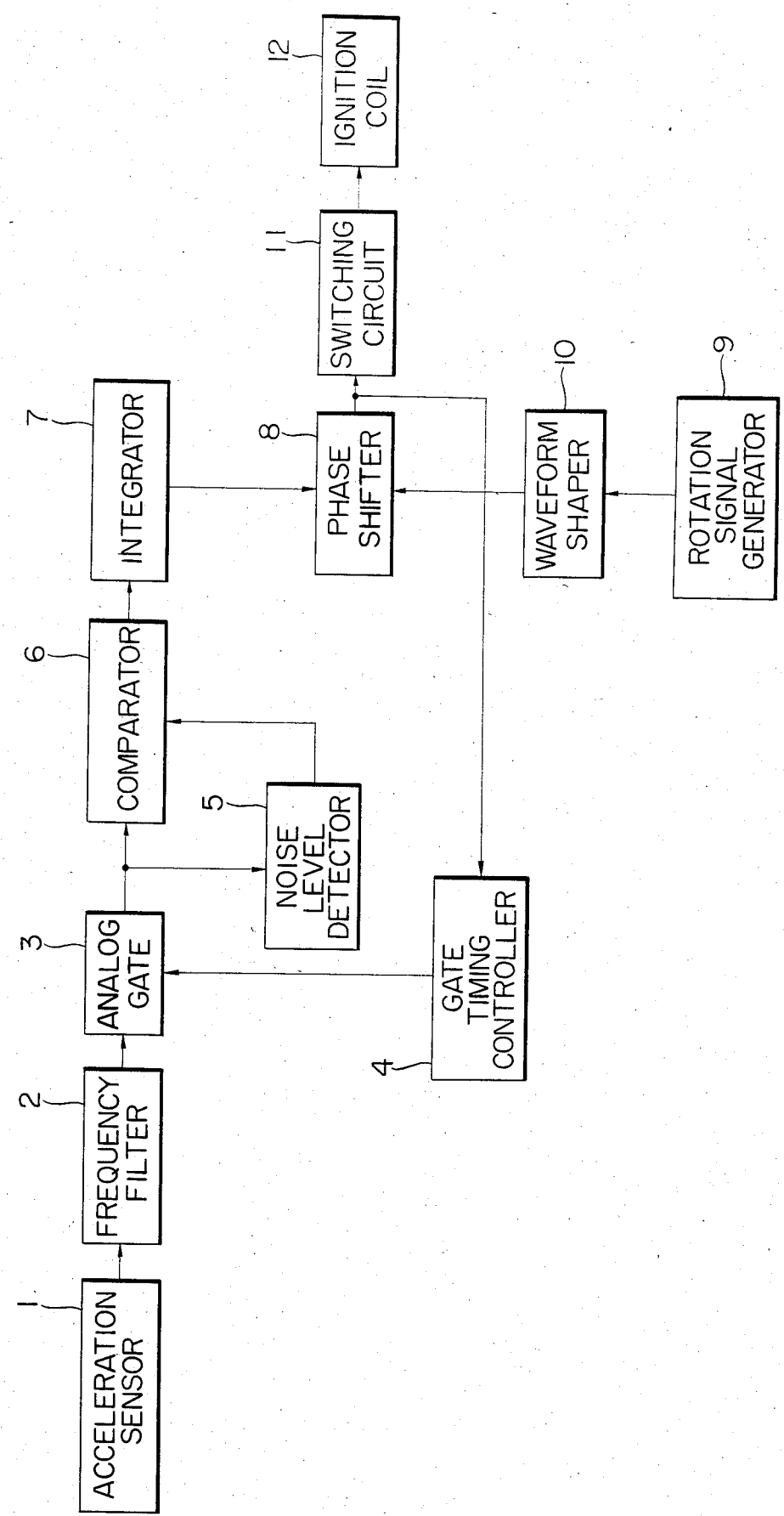
FIG. 1 shows a block diagram of the structure of a conventional ignition timing control apparatus for an internal combustion engine.
Figure 2:
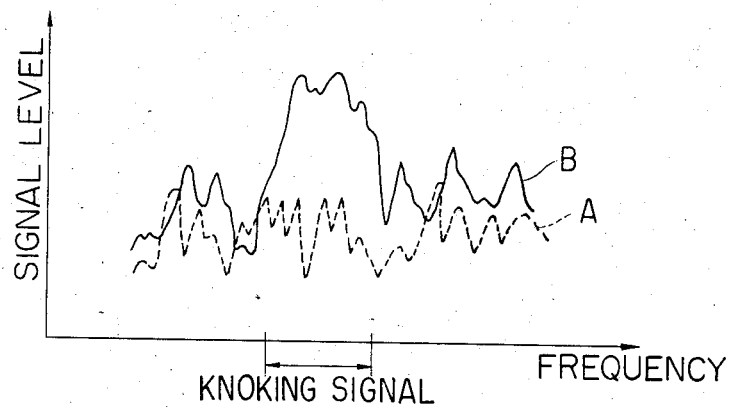
FIG. 2 shows a graphical diagram of frequency vs. signal level characteristic of the output of an acceleration sensor.
Figure 3:
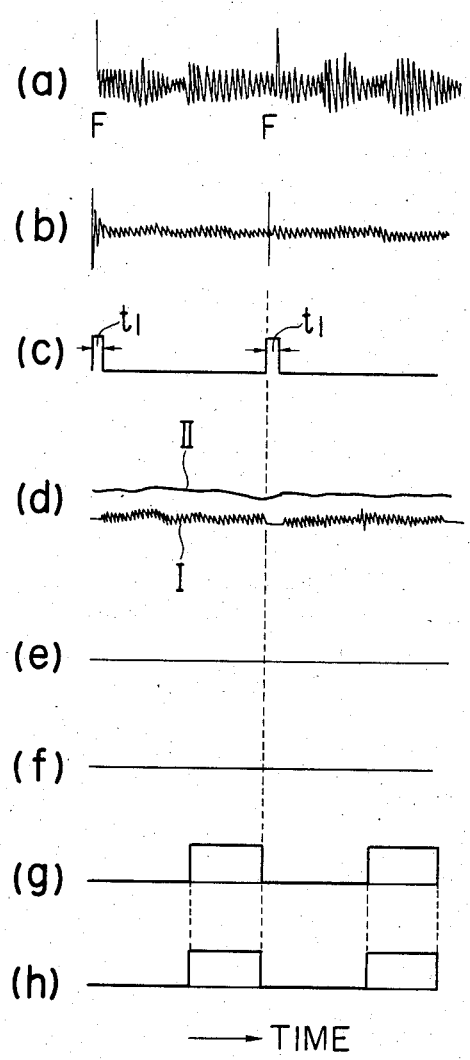
FIG. 3 and 4 show time charts of the operating waveforms of the conventional apparatus in FIG. 1.
Figure 5:
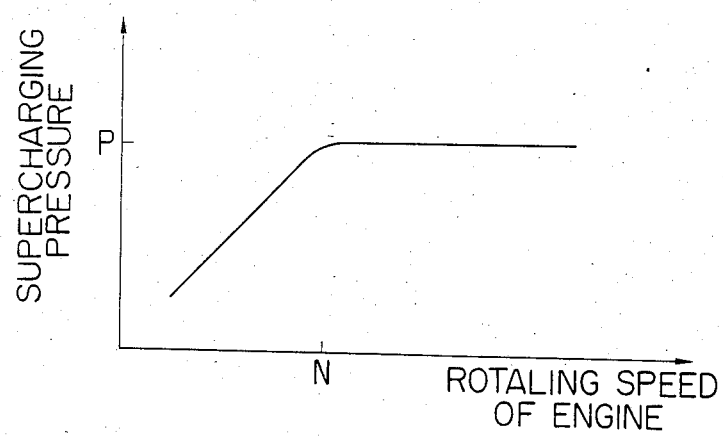
FIG. 5 shows a graphical diagram of the supercharging characteristic of a supercharger.
Figure 6:
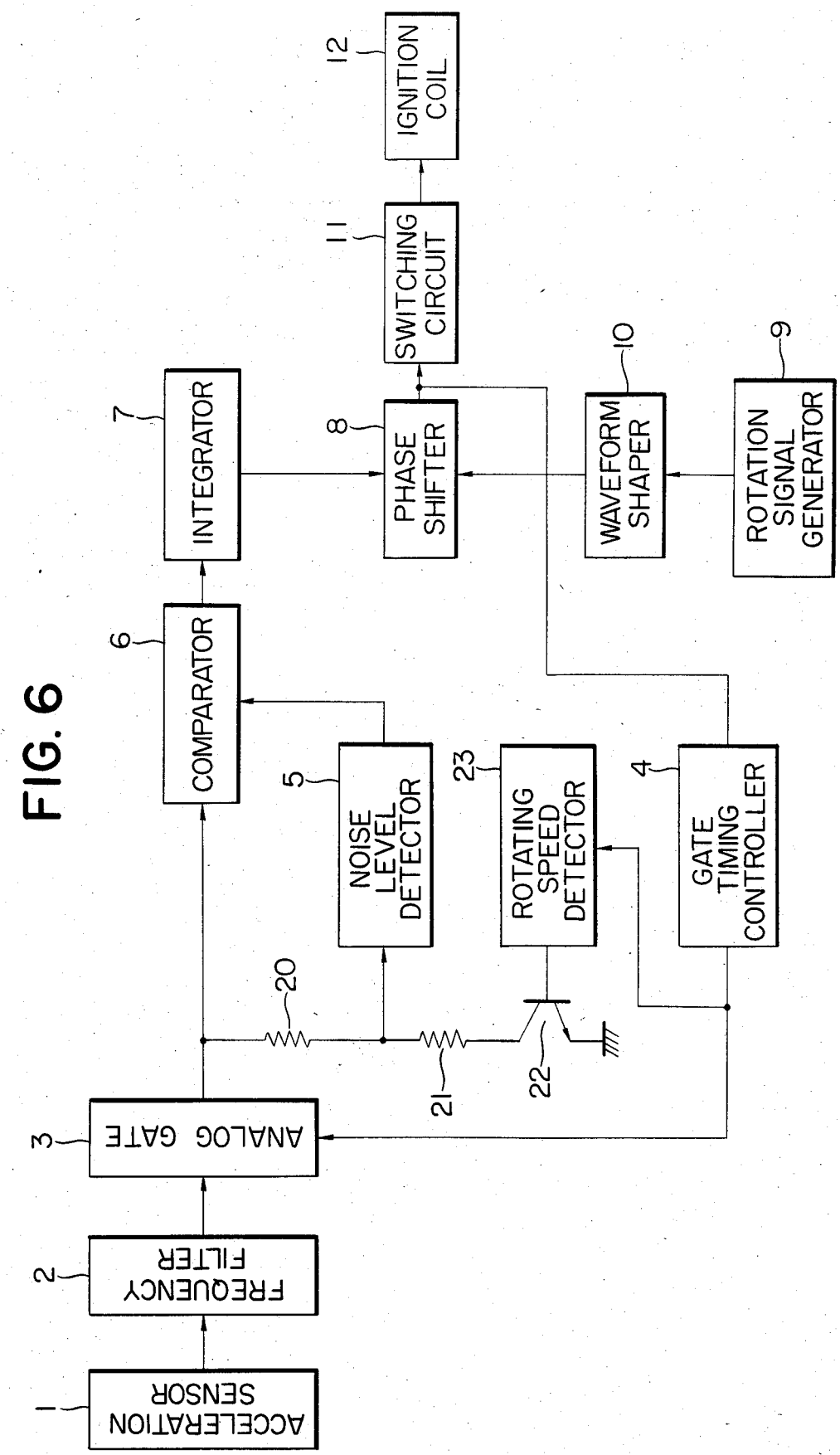
FIGS. 6 to 9 show block diagrams respectively of preferable various embodiments of an ignition timing control apparatus for an internal combustion engine according to the present invention.

An embodiment of the present invention in FIG. 6 is basically adapted to detect a partial load range (practical rotating range) of supercharging characteristic where the rotating speed of the engine is lower than a predetermined value N shown in FIG. 5 while detecting a knocking signal under an altered state, according to the detection of the partial load range, where an input to the noise level detector 5 shown in FIG. 1 is altered as a comparison reference of a knock signal detecting portion in response to the rotating speed of an engine, whereby the lag angle of ignition timing is reduced.

In FIG. 6, the same numerals indicate the same or corresponding constituents as those in FIG. 1, and the same description will be omitted. A resistor 20 is connected between the output of an analog gate 3 and an input of a noise level detector 5, a resistor 21 has one end thereof connected to the connecting point of the level detector 5 and the resistor 20, and the other end thereof connected to the collector of a transistor 22, the emitter of the transistor 22 is connected to ground, and the base of the transistor 22 is connected to the output of a rotating speed detector 23 for detecting the rotating speed N of an engine from the output of a gate timing controller 4. The detected rotating speed of the rotating speed detector 23 is N.

The rotating speed detector 23 detects the rotating speed N of the engine on the basis of the output of the gate timing controller 4 to drive the transistor 22 to its OFF state when the rotating speed of the engine is N or less and to its ON state when the rotating speed of the engine is more than N. When the transistor 22 is OFF, the output voltage of the analog gate 3 is inputted through the resistor 20 to the noise level detector 5 by 100%, i.e., without any change. On the other hand, when the transistor is ON, the collector of the transistor 22 is at the grounded potential. Accordingly, one terminal of the resistor 21 connected to the collector of the transistor 22 is also at the ground potential, the output voltage of the analog gate 3 is divided by the resistors 20 and 21 and inputted to the noise level detector 5. Therefore, the input voltage of the noise level detector 5 is varied in such a manner that, when the rotating speed of the engine is N or less, the input voltage is larger than the input voltage when the rotating speed of the engine is higher than N. Accordingly, the output of the noise level detector 5 correspondingly has such similar levels, wherein, when the rotating speed of the engine is N or less, the output voltage of the noise level detector 5 is larger than the output voltage when the rotating speed of the engine is higher than N.

Figure 4:
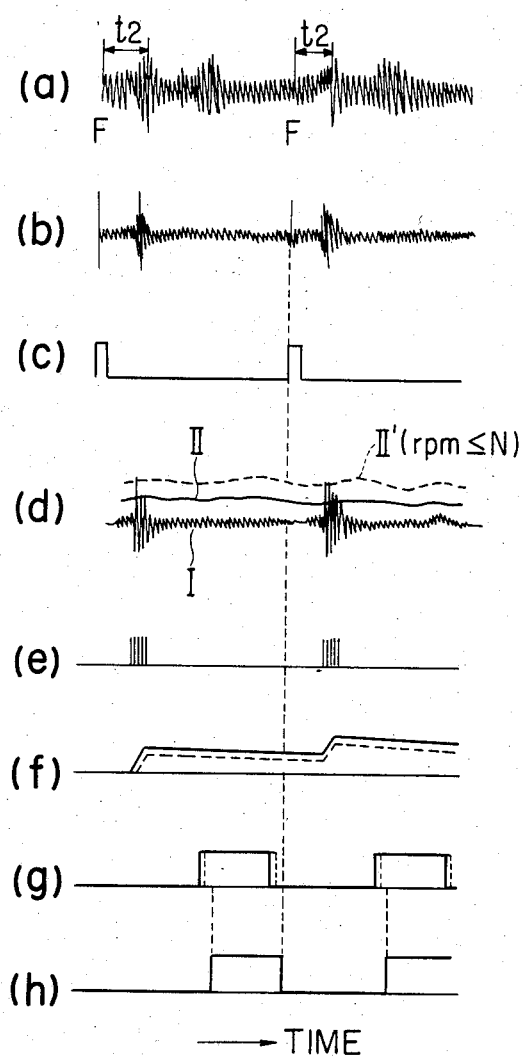

Referring to the waveform in FIG. 4(d), the level difference of the waveform II in FIG. 4(d) with respect to the waveform I in FIG. 4(d) is higher in the case where the rotating speed of the engine is N or less than that of the case where the rotating speed of the engine is higher than N, as shown by waveform II' (dotted lines) in FIG. 4(d).

Since the comparator 6 detects a knock signal by the level comparsion of the output of the analog gate 3 with that of the noise level detector 5, and since the output level of the noise level detector 5 to the output of the analog gate 3 varies in response to the rotating speed range of the engine as described above, the knock signal detected when the rotating speed of the engine is N or less is higher in level than the knock signal detected when the rotating speed of the engine is higher than N.

As a result, since the number of knock signal pulses detected when the rotating speed of the engine is N or less, i.e., the output of the comparator 6, becomes less than that detected when the rotating speed of the engine is higher than N, whereby the output of the integrator shown in FIG. 4(f) becomes lower similarly as shown by dotted lines, and the amount of phase shift in the phase shifter 8 becomes smaller, so that the delay amount of the ignition timing becomes less, with the result that the delayed ignition timing is set to a leading phase from the reference ignition timing shown by dotted line in FIG. 4(g), thereby improving the power of the engine.

It is to be noted that while in FIG. 6, the input of the noise level detector 5 is varied in response to the rotating speed of the engine to thereby alter the ratio of the two inputs of the comparator 6, the output of the noise level detector 5 may be varied in response to the rotating speed of the engine by any other similar method.

Figure 7:
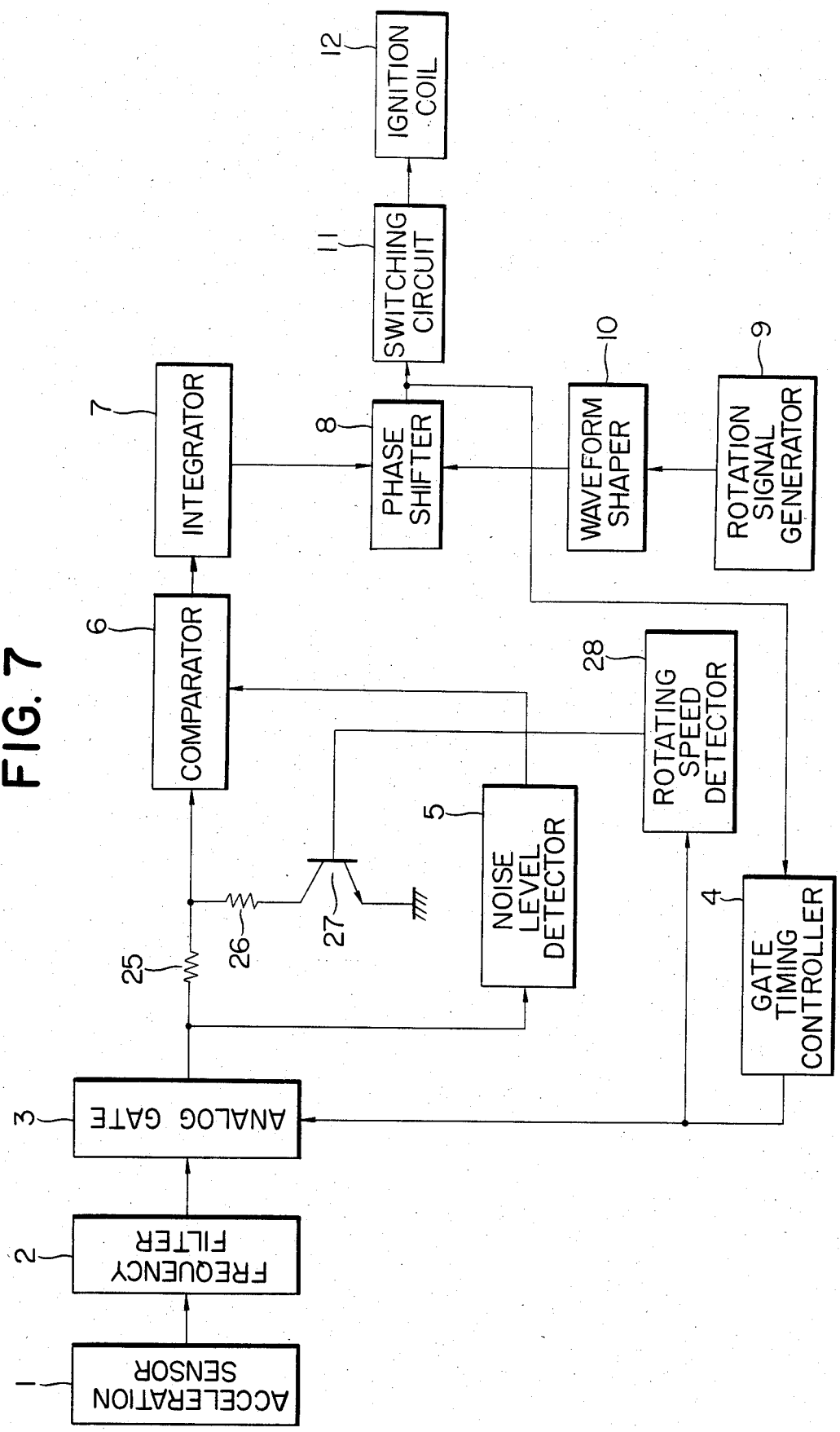

In another embodiment of the present invention shown in FIG. 7, only the signal inputted from the analog gate 3 to the comparator 6 is varied in response to the rotating speed of the engine, the level ratio of the inputs of the comparator 6 is relatively thereby altered, the output of the noise level detector 5 being not affected this time by the level change as in the above embodiment, whereby the amount of the delay angle in the case that the rotating speed of the engine is N or less is reduced.

In FIG. 7, the same numerals indicate the same or corresponding constituents in FIG. 1 described above, and the description thereof will be omitted. A resistor 25 is connected between the output of the analog gate 3 and the comparator 6, and the collector of a transistor 27 is connected through a resistor 26 to the connection point of the resistor 25 and the comparator 6. The emitter of the transistor 27 is connected to the ground, and the base of the transistor 27 is connected to the output of the rotating speed N detector 28 for detecting the rotating speed of the engine from the output of the gate timing controller 4. Even in this case, the detected rotating speed is N.

The rotating speed detector 28 detects the rotating speed N of the engine on the basis of the output of the gate timing controller 4 and drives the transistor 27 to its ON state when the rotating speed of the engine is N or less and to its OFF state when the rotating speed of the engine is higher than N, respectively. When the transistor 27 is ON, the output of the analog gate 3 is divided by the resistors 25 and 26, and the divided output is inputted to the comparator 6. On the other hand, when the transistor 27 is OFF, the output of the analog gate 3 is inputted through the resistor 25 to the comparator 6 by 100%, i.e., as it is. Therefore, the input to the comparator 6 from the analog gate 3 is varied in such a manner that when the rotating speed of the engine is N or lower the voltage inputted is lower than the voltage inputted when the rotating speed of the engine is higher than N. Referring to FIG. 4(d), when the rotating speed of the engine is N or lower, the level difference of the waveform I in FIG. 4(d) with respect to the waveform II in FIG. 4(d) is greater in the case where the rotating speed of the engine is N or less than that in the case where the rotating speed of the engine is higher than N.

As a result, the level ratio of the input voltages to the comparator 6 alters depending upon the rotating speed of the engine, so that in the case where the rotating speed is N or lower, the comparator 6 detects only larger knocking signals as compared with the case where the rotating speed of the engine is higher than N. Therefore the output of the integrator 7 becomes lower in the case where the rotating speed of the engine is N or lower, so that the degree of phase shift by the phase shifter 8 becomes smaller, with the result that the delayed angle of the ignition timing signal becomes less in the same manner as in the case of the previous embodiment.

Figure 8:
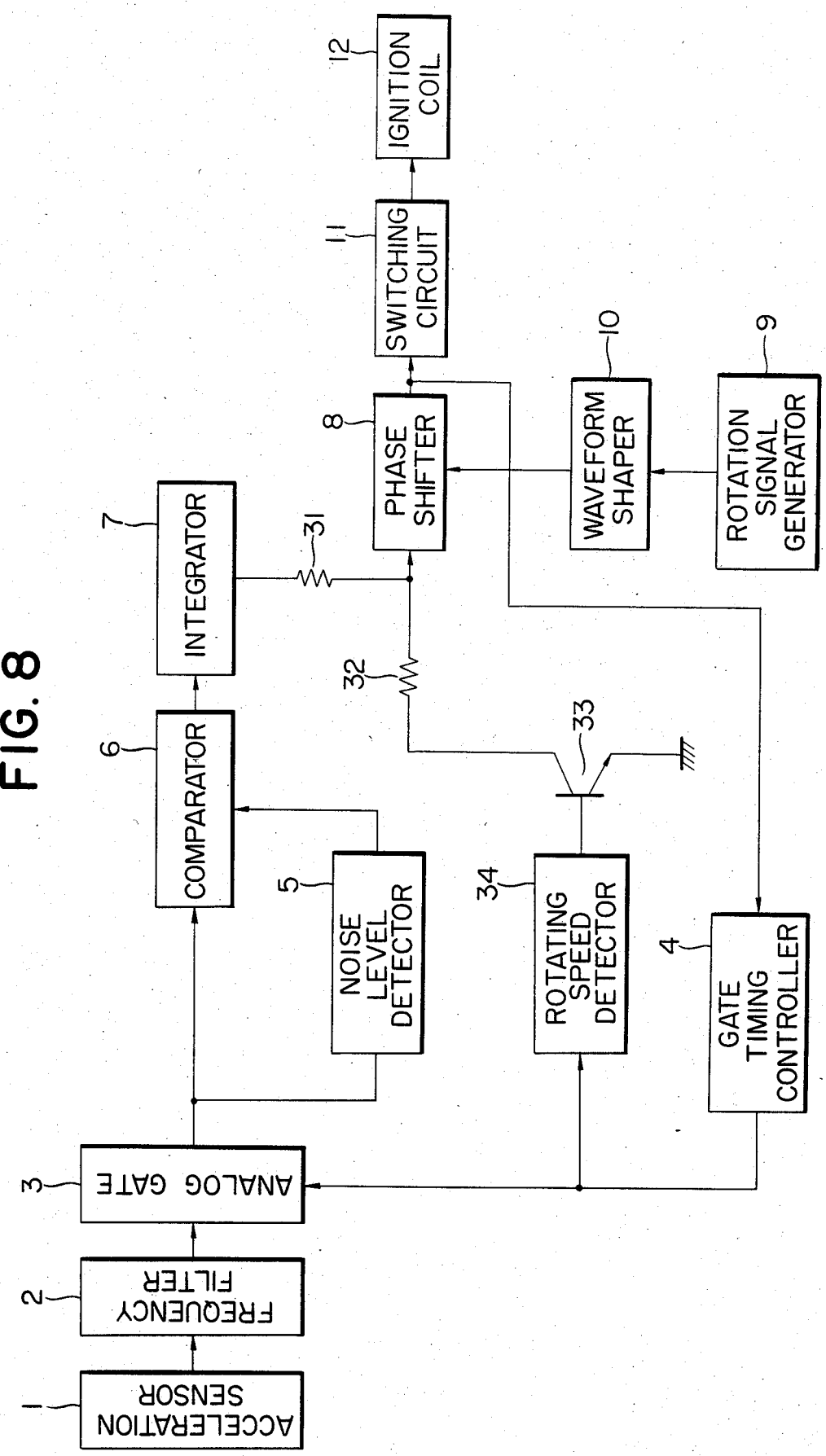

In still another embodiment of the invention shown in FIG. 8, the input voltage from the integrator 7 to the phase shifter 8 is controlled in response to the rotating speed of the engine so as to limit the angle of the phase shift (phase retard angle) of the reference ignition signal in the phase shifter 8 in the practical rotating speed region in FIG. 5.

In FIG. 8, a resistor 31 is connected between the integrated voltage output of the integrator 7 and the input terminal of the phase shifter 8, and the input terminal of the phase shifter 8 is further connected through a resistor 32 to the collector of a transistor 33. The emitter of the transistor 33 is grounded, and the base of the transistor 33 is connected to the output of a rotating speed detector 34 for detecting the rotating speed N of the engine from the output of the gate timing controller 4. The detected rotating speed of the engine is N.

The rotating speed detector 34 detects the rotating speed N of the engine on the basis of the output of the gate timing controller 4, and drives the transistor 33 to its ON state when the rotating speed of the engine is N or lower and to its OFF state when the rotating speed of the engine is higher than N, respectively. When the transistor 33 is ON, the output signal of the integrator 7 is divided by the transistors 31 and 32, and the divided signal is inputted to the phase shifter 8. On the other hand, when the transistor 33 is OFF, the output signal of the integrator 7 is inputted through the resistor 31 to the phase shifter 8 by 100%, i.e., as it is.

As a result, the input voltage of the phase shifter 8, i.e., the integrated voltage output of the integrator 7 becomes lower in the case where the rotating speed of the engine is N or lower, compared with the case that the rotating speed of the engine is higher than N, and so the phase shift angle (the phase retard angle) out of the reference ignition signal is suppressed in response to the reduced integrated voltage. Accordingly, the quantity of the delayed angle is limited to a smaller value in the case where the rotating speed of the engine is N or less than in the case where the rotating speed of the engine is higher than N in the same manner as the previous embodiments.

Figure 9:
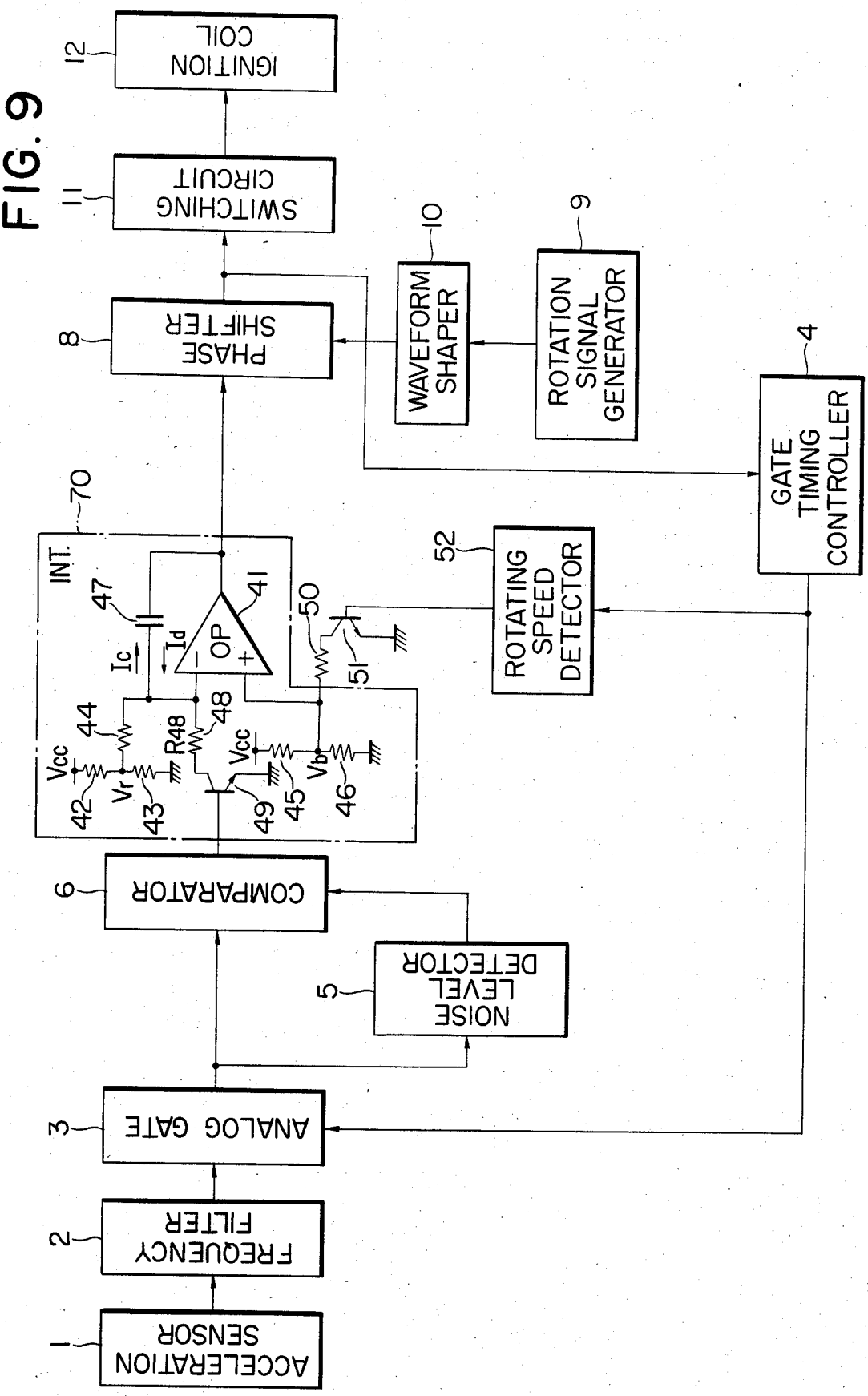

In still another embodiment of the invention shown in FIG. 9, a phase shift angle (the phase retard angle) of the reference ignition signal in the phase shifter 8 is controlled by controlling the integrated voltage output of an integrator.

In FIG. 9, the same numerals indicate the same or corresponding constituents in FIG. 1, and the description therefor will be omitted. An integrator 70 comprises an operational amplifier 41, and resistors 42 to 46, the resistors 42 and 43 being connected in series, the other terminal of the resistor 42 being connected to a D.C. power terminal Vcc, and the other terminal of the resistor 43 being connected to ground. The resistor 44 is connected between the connecting point of the resistors 42 and 43 and the inverting input terminal of the operational amplifier 41. The resistors 45 and 46 are connected in series, the other terminal of the resistor 45 is connected to a D.C. power terminal Vcc, the other terminal of the resistor 46 is connected to the ground and the connecting point of these resistors 45 and 46 is connected to the non-inverting input terminal of the operational amplifier 41. A capacitor 47 is connected between the inverting input terminal and the output of the operational amplifier 41. The resistor 48 is connected between the inverting input terminal of the operational amplifier 41 and the collector of a transistor 49. The transistor 49 is driven by the comparator 6. A resistor 50 is connected between the non-inverting input terminal of the operational amplifier 41 and the collector of a transistor 51. Rotating speed detector 52 detects the rotating speed of the engine from the output of the gate timing controller 4 and drives a transistor 51.

The integrator 70 generates an integrated voltage when the comparator 6 detects a knock signal to drive the transistor 49 to its ON state. The output characteristic of the integrated voltage of the integrator 70 at this time depends upon a charging current Ic of the capacitor 47 determined by a bias voltage Vb of the non-inverting input set by the resistors 45 and 46 and the resistance value $R_{48}$ of the resistor 48, where, $Ic = Vb/R_{48}$.

On the other hand, when the comparator 6 does not detect the knock signal and so the transistor 49 is OFF, a discharging current Id flows to the capacitor 47, and the integrated voltage gradually decreases with time. This discharging current Id depends upon the voltage difference $(Vr - Vb)$ between the reference voltage Vr set by the resistors 42 and 43 and the bias voltage Vb applied to the non-inverting input terminal, divided by the resistance value $R_{44}$ of the resistor 44 so that $Id=(Vr-Vb)/R_{44}$.

Since the integrated voltage is determined by the current ratio of the charging current Ic flowing into the capacitor 47 and the discharging current Id, the charging current Ic is reduced or the discharging current Id is increased so as to decrease the integrated voltage. In this case, the integrated voltage is reduced by decreasing the charging current Ic.

A rotating speed detector 52 detects the rotating speed N of the engine on the basis of the output of the gate timing controller 4, and drives the transistor 51 to its ON state when the rotating speed of the engine is N or less and to its OFF state when the rotating speed of the engine is higher than N, respectively. When the transistor 51 is ON, the collector of the transistor 51 is at the ground level, and accordingly the resistors 46 and 50 are connected in parallel with each other. Thus, the bias voltage Vb of the non inverting input terminal of the operational amplifier 41 during the ON state of the transistor 51 has a voltage level determined by the power voltage Vcc and the series-parallel resistance of the resistors 45, and, 46, 50, which is lower than the voltage Vb during the OFF state of the transistor 51, namely the level determined by the power voltage Vcc and the resistors 45 and 46. Therefore, the charging current $Ic(=Vb/R_{48})$ of the capacitor 47 when the rotating speed of the engine is N or less becomes smaller than the charging current Ic when the rotating speed of the engine is higher than N, and the integrated voltage output signal outputted from the integrator 70 when the transistor 49 is switched ON becomes smaller in the case when the rotating speed of the engine is N or less than in the case where the rotating speed of the engine is higher than N.

Figure 10:
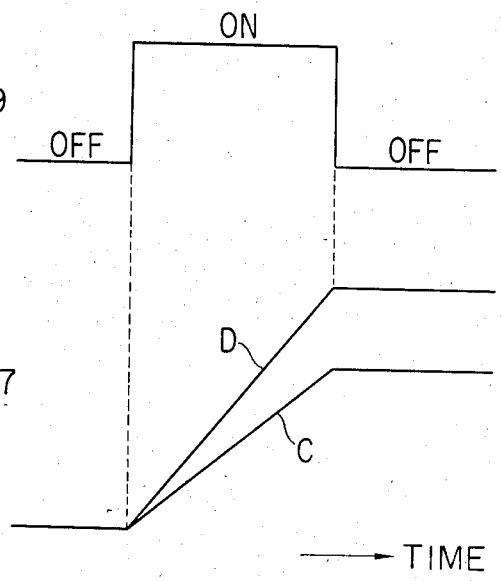
FIG. 10 shows a graphical diagram of the output characteristic of an integrator applied to the embodiment in FIG. 9.

FIG. 10 shows a graphical diagram of the output signals of the integrator 70 as a function of the transistor 49 being ON or OFF which controls the current charging rate of the capacitor 47 as shown in the embodiment in FIG. 9. FIG. 10(a) shows the operating state of the transistor 49, and FIG. 10(b) shows the waveform illustrating the amplitude of the output signal of the integrator 70. The integrated output signal C shows the case where the charging current Ic of the capacitor 47 is less than the output signal D, and the output signal C indicates the characteristic in the case where the rotating speed of the engine is N or less, and the output signal D indicates the characteristic in the case where the rotating speed of the engine is higher than N.

As a result, since the integrated voltage output of the integrator 70 outputted for the same knock signal when the rotating speed of the engine is N or less becomes smaller than that when the rotating speed of the engine is higher than N, the phase shift angle (phase retard angle) of the reference ignition signal in the phase shifter 8 controlled in response to the integrated voltage output of the integrator 70 also becomes smaller in the same manner as in the case of the previous embodiments of the invention.

Figure 11:
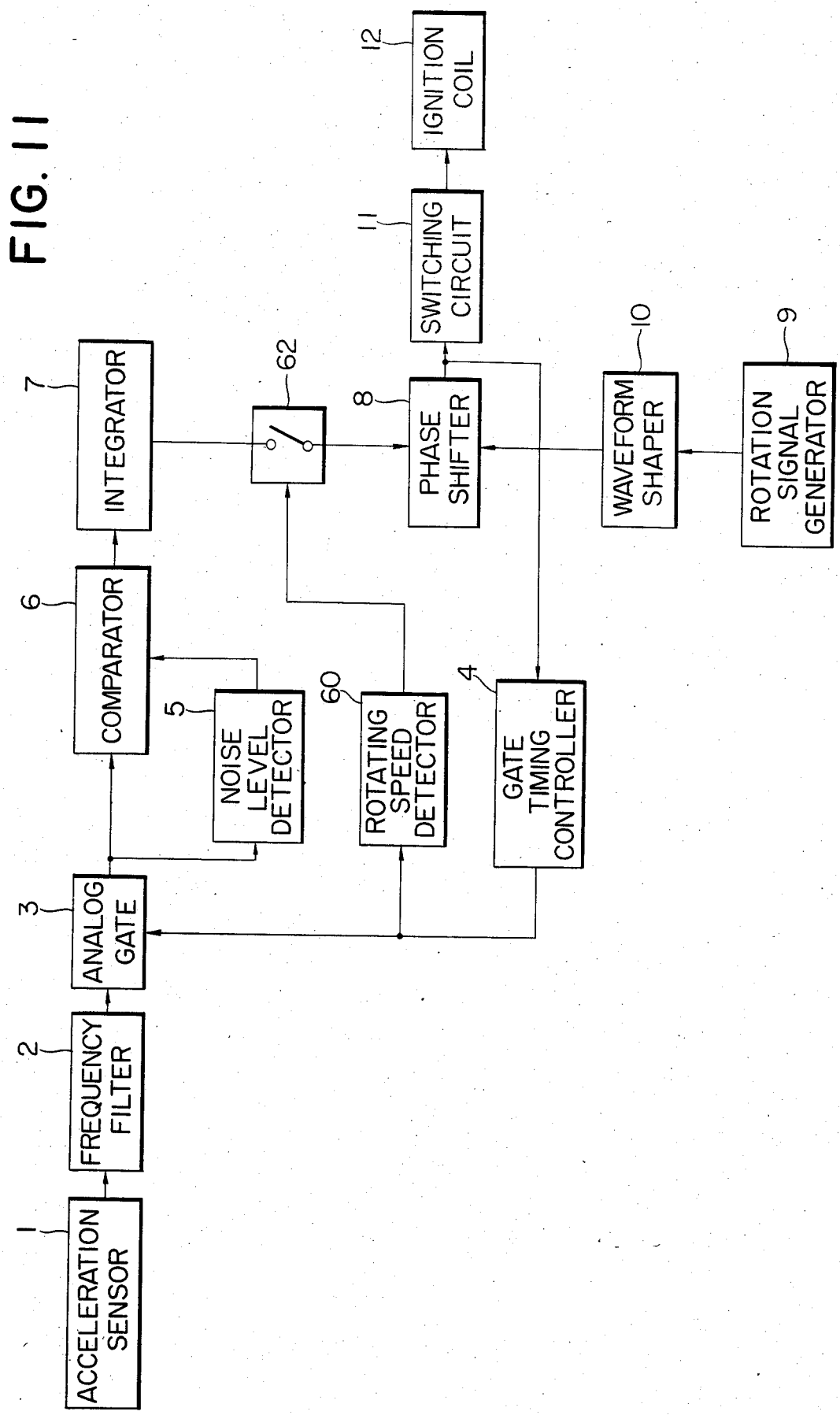
FIGS. 11 to 13 show block diagrams respectively of preferable various other embodiments of an ignition timing control apparatus for an internal combustion engine according to the present invention.

FIG. 11 shows still another embodiment of the present invention. In FIG. 11, a switch 62 is provided between an integrator 7 and a phase shifter 8, a rotating speed detector 60 is used for detecting the rotating speed of the engine on the basis of the output from a gate timing controller 4, and the switch 62 is controlled by the output of the rotating speed detector 60. The other arrangements are constructed in the same manner as the case of FIG. 1, and the operation therefor will not be repeated.

In the above arrangements, the rotating speed detector 60 detects the rotating speed of the engine on the basis of the output of the gate timing controller 4 and controls to open the switch 62 when the rotating speed of the engine is N or less, and to close the switch 62 when the rotating speed of the engine is higher than N, respectively. Thus, the output of the integrator 7 is not inputted to the phase shifter 8 when the rotating speed of the engine is N or less, while the output is inputted to the phase shifter 8 when the rotating speed of the engine is higher than N. As a result, the phase shifting control in the phase shifter 8 is not carried out when the rotating speed of the engine is N or less, while it is carried out when the rotating speed of the engine is higher than N. Therefore, the ignition timing is determined by the reference ignition timing of the output of the rotating signal generator 9 when the rotating speed of the engine is N or less, while it is determined by the output of the phase shifter 8 controlled in delay angle in response to the output of the integrator 7 when the rotating speed of the engine is higher than N.

Figure 12:
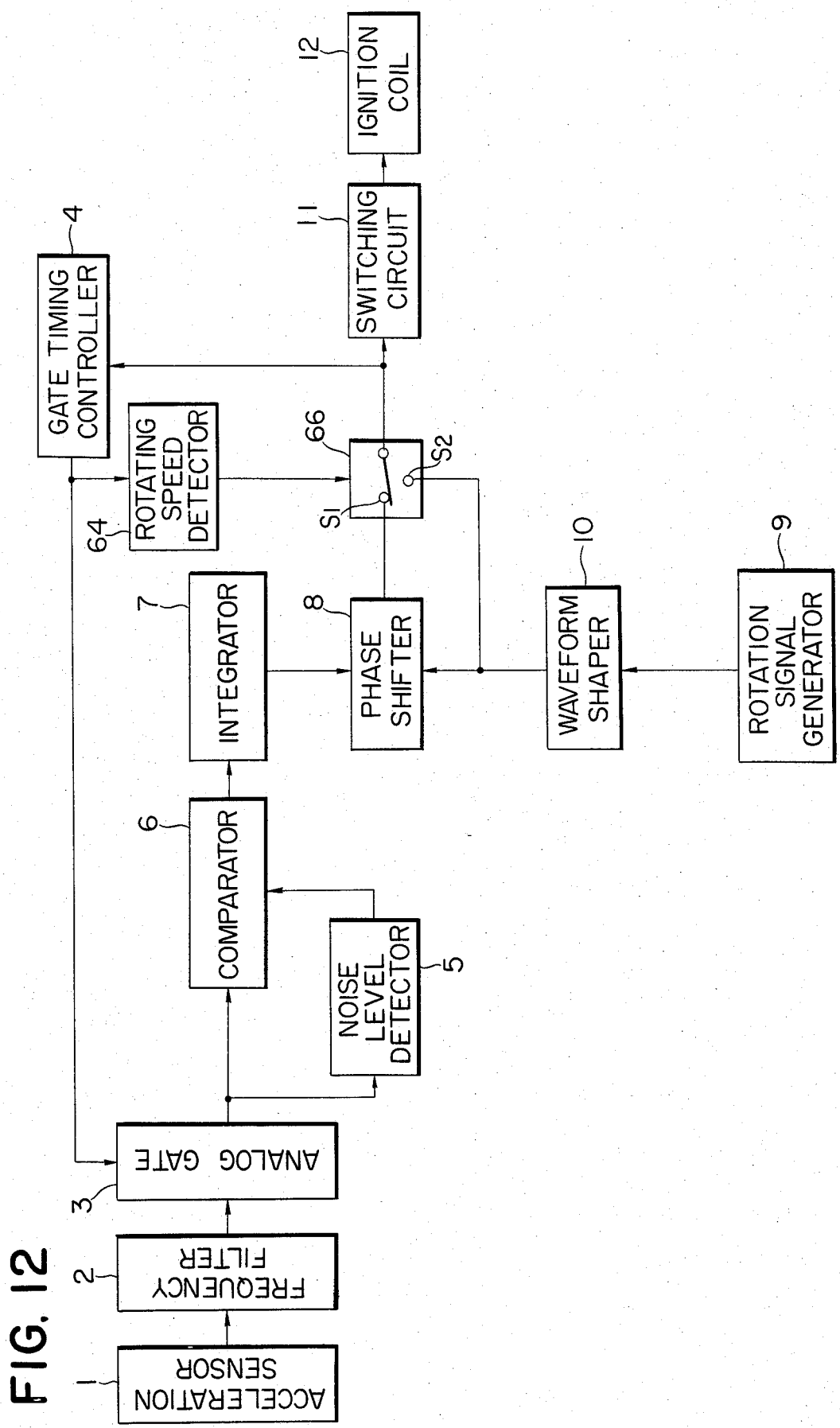

FIG. 12 shows still another embodiment of the present invention. In FIG. 12, a switch 66 is provided for switchably outputting the outputs of a waveform shaper 10 and the phase shifter 8 to a switching circuit 11, a rotating speed detector 64 is used for detecting the rotating speed of the engine on the basis of the output of the gate timing controller 4, and the switch 66 is controlled by the output of the rotating speed detector 64. The other arrangements are constructed in the same manner as the case of FIG. 1, and the description therefor will not be repeated.

In the above arrangements, the rotating speed detector 64 detects the rotating speed of the engine on the basis of the output of the gate timing controller 4 and controls the switch 66. More specifically, the switch 66 is transferred to a contact S2 at the output side of the waveform shaper 10 when the rotating speed of the engine is N or less, while it is transferred to a contact point S1 at the output side of the phase shifter 8 when the rotating speed of the engine is higher than N. As a result, the ignition timing is determined by the ignition signal of the output of the rotating signal generator 9 when the rotating speed of the engine is N or less, while it is determined by the output of the phase shifter 8 when the rotating speed of the engine is higher than N. In this manner, the phase shifting angle (phase retard angle) can be controlled in the same manner as the above previous embodiments of the invention.

As described above, while in the embodiments respectively shown in FIGS. 6 to 9, 11 and 12, the rising portion of the rotation during the supercharging is detected to control various parameters, the present invention is not to be limited to the particular embodiments. For example, an intake manifold pressure of the engine may be detected to obtain the supercharging pressure from the detected signal so as to discriminate whether it is the maximum value or not. Thus, the various parameters are controlled so as to similarly control the phase retard angle as described above.

Figure 13:
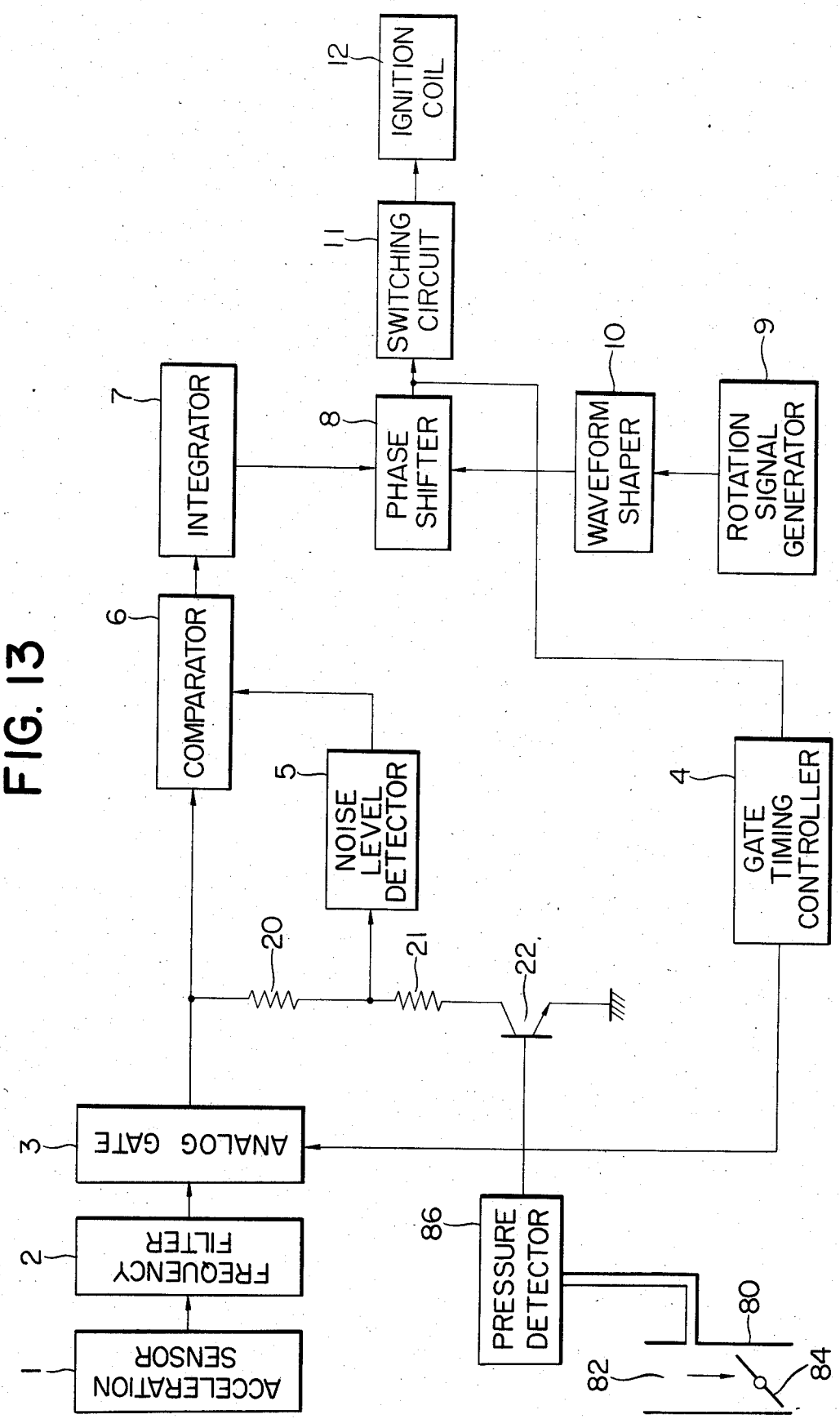

More particularly, in the embodiment of the invention shown in FIG. 13 as a modified embodiment of the apparatus in FIG. 6, briefly, an input to the noise level detector 5 shown in FIG. 1 as described above, which is used as a reference for comparison in the knock signal detecting portion is varied in response to the intake manifold pressure of the engine, thereby detecting a knock signal larger in the rising region of the supercharging characteristic where the rotating speed of the engine is N or less in FIG. 5 than one in the region where the rotating speed of the engine is higher than N.

In FIG. 13, the same numerals designate the same or equivalent constituents as those in FIG. 1, and the description thereof will not be repeated. An intake minifold 80 of the engine intakes intake air 82 under the control of a throttle valve 84, and the pressure of the intake air 82 is detected by a pressure detector 86 for driving a transistor 22.

Figure 14:
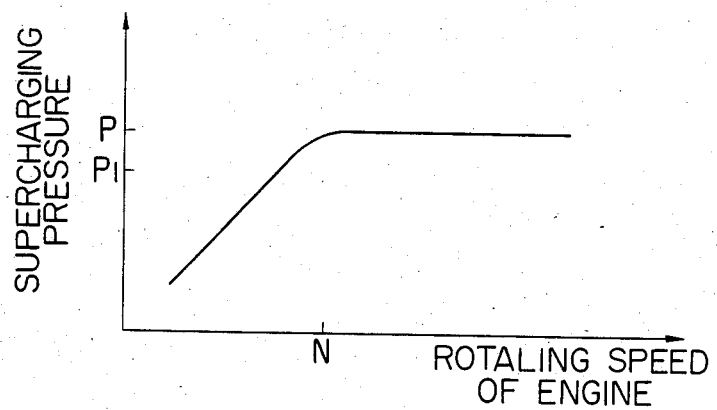
FIG. 14 shows a graph of the supercharging characteristic of a supercharger for describing the relationship between the intake pressure and the rotating speed of the engine.

The pressure detector 86 obtains a supercharging pressure on the basis of the detected output and drives a transistor 22 to its OFF state when the supercharging pressure of the characteristic in FIG. 14 is pressure $P_1$ or less, and to its ON state when the supercharging pressure is higher than the pressure $P_1$.

More particularly, in comparing FIG. 13 with FIG. 6, they are different in that the pressure detector 86 using the intake pressure in FIG. 13 is substituted for the rotating speed detector 23 of the engine in FIG. 6 whereby a phase-shifting angle (phase retard angle) is limited to a small value when the intake pressure or the supercharging pressure of the engine is $P_1$ or less. In FIG. 14, the reference value $P_1$ of the supercharging pressure is made lower than the supercharging pressure P corresponding to the rotating speed N of the engine in order to improve the response delay.

It is apparent by those skilled in the art that the pressure detector may be similarly applied instead of the rotating speed detector of the engine even in the embodiments described and shown with reference to FIGS. 7 to 9, 11 and 12 as to the ignition timing control apparatus for the internal combustion engine.

In the embodiments described above, the engine having the supercharger has been described. However, the various embodiments of the present invention may also be applied to the ordinary engine having no supercharger. In this case, a load range is divided into full load range and a partial load range, or the apparatus may be controlled in response to the rotating speed of the engine.

Further, when the integrated output from the integrator is controlled by a microcomputer in response to the load range or rotating speed of the engine, the aparatus of the invention may be controlled more finely as compared with the above-described various embodiments.

According to the present invention as described above, the ignition timing is optimized to enable the output of the engine as a function of the load range to be increased, and particularly the delay of the response of the supercharger at the acceleration time can be improved by the increase of the output in the rising region of the supercharging characteristic in the engine having the supercharger with high power, so that the apparatus of the invention can not only suppress the knocking but also obtain an excellent acceleration characteristic, thereby improving the fuel comsumption.

The present invention is not limited to the particular embodiments described above, but various other charges and modifications may be made within the spirit and scope of the present invention.

What I claim as a patent is:

1. An ignition timing control apparatus for an internal combustion engine including a supercharger having an operating characteristic such that the supercharging pressure rises with increasing engine spped to a supercharged pressure limit and thereafter remains generally constant with increasing engine speed, said ignition timing control apparatus comprising:
    an acceleration sensor for detecting the vibrating acceleration of the internal combustion engine;
    discriminating means for removing a noise signal component from the output of said acceleration sensor to discriminate a knocking signal component;
    generation means for generating reference ignition timing signals;
    phase shift means for phase-shifting the phase of said reference ignition timing signals in response to the output of said discriminating means;
    switch means for switching the energization of an ignition coil in response to the output of said phase shift means;
    detector means coupled to the engine for monitoring a load condition indicative of the operating characteristic of the supercharger and generating a first signal in the rising portion of the supercharger operating characteristic and a second signal in the constant portion of the supercharger operating characteristic; and
    control means for controlling the phase shift variable of said reference ignition timing signals in response to the signals generated by said detector means.

2. An ignition timing control apparatus for an internal combustion engine according to claim 1 wherein:
    said discriminating means comprises a frequency filter for passing therethrough a signal component of the output of said acceleration sensor of a frequency corresponding to the knocking of said engine, an analog gate connected to said frequency filter, a gate timing controller responsive to the output of said phase shift means to cause said analog gate to block noises, of the output of said frequency filter, which are obstructive in the detection of the knocking, a noise level detector responsive to the peak value of the output of said analog gate to provide as an output a DC voltage slightly higher than the peak value, and a comparator for comparing the outputs of said analog gate and said noise level detector to provide an output if the latter is higher than the former.

3. An ignition timing control apparatus for an internal combustion engine according to claim 2 wherein:
    said phase shift means comprises an integrator which integrates the output of said comparator, and a phase shifter for phase-shifting said reference ignition timing signal in response to the level of the integrated output of said integrator.

4. An ignition timing control apparatus for an internal combustion engine according to claim 3 wherein:
    said detector means comprises a rotating speed detector of said engine connected to the output of said gate timing controller and said control means comprises a voltage divider, one terminal of which is connected to the output of said analog gate and the dividing terminal of which is connected to the input of said noise level detector, and a transistor having a collector connected to the other terminal of said voltage divider, a base connected to the output of said rotation detector, and an emitter grounded, said rotating speed detector switching off said transistor when the rotating speed is below a predetermined value corresponding to the supercharged pressure limit.

5. An ignition timing control apparatus for an internal combustion engine according to claim 3 wherein:
said detector means comprises a rotating speed detector of said engine connected to the output of said gate timing controller and said control means comprises a voltage divider including two resistors, the first of which is inserted between said analog gate and said comparator and the second of which is connected at one terminal to the input of said comparator, and a transistor having a collector connected to the other terminal of said second resistor, a base connected to the output of said rotating speed detector, and an emitter grounded, said rotating speed detector switching on said transistor when the rotating speed is below a predetermined value corresponding to the supercharged pressure limit.

6. An ignition timing control apparatus for an internal combustion engine according to claim 3 wherein:
said detector means comprises a rotating speed detector of said engine connected to the output of said gate timing controller and said control means comprises a voltage divider including two resistors, the first of which is inserted between said integrator and said phase-shifter and the second of which is connected at one terminal to the input of said phase-shifter, and a transistor having a collector connected to the other terminal of said second resistor, a base connected to the output of said rotating speed detector, and an emitter grounded, said speed detector switching on said transistor when the rotating speed is below a predetermined value corresponding to the supercharged pressure limit.

7. An ignition timing control apparatus for an internal cimbustion engine according to claim 3 wherein:
said detector means comprises a rotating speed detector of said engine connected to the output of said gate timing controller and said control means comprises a transfer switch connected between said integrator and said phase shifter and controlled by said rotating speed detector, said rotating speed detector switching off said switch when the rotating speed is below a predetermined value corresponding to the supercharged pressure limit.

8. An ignition timing control apparatus for an internal combustion engine according to claim 3 wherein:
said detector means comprises a rotating speed detector of said engine connected to the output of said gate timing controller and said control means comprises a transfer switch connected to said phase shifter, said generation means, and said swtich means and having one transfer terminal connected to said phase shifter and the other transfer terminal connected to said generation means, said rotating speed detector causing said switch to connect said phase shifter to said switch means when the rotating speed is above a predetermined value corresponding to the supercharged pressure limit.

9. An ignition timing control apparatus for an internal combustion engine according to claim 3 wherein:
said detector means comprises a pressure detector connected to a suction tube of said engine and said control means comprises a voltage divider, one terminal of which is connected to the output of said analog gate and the dividing terminal of which is connected to the input of said noise level detector, and a transistor having a collector connected to the other terminal of said voltage divider, a base connected to the output of said pressure detector, and an emitter grounded, said pressure detector switching off said transistor when the suction pressure is below a predetermined value corresponding to the supercharged pressure limit.

10. An ignition timing control apparatus for an internal combustion engine according to claim 3 wherein:
said detector means comprises a pressure detector connected to a suction tube of said engine and said control means comprises a voltage divider including two resistors, the first of which is inserted between said analog gate and said comparator and the second of which is connected at one terminal to the input of said comparator, and a transistor having a collector connected to the other terminal of said second resistor, a base connected to the output of said pressure detector, and an emitter grounded, said pressure detector switching on said transistor when the suction pressure is below a predetermined value corresponding to the supercharged pressure limit.

11. An ignition timing control apparatus for an internal combustion engine according to claim 3 wherein:
said detector means comprises a pressure detector connected to a suction tube of said engine and said control means comprises a voltage divider including two resistors, the first of which is inserted between said integrator and said phase-shifter and the second of which is connected at one terminal to the input of said phase-shifter, and a transistor having a collector connected to the other termianl of said second resistor, a base connected to the output of said pressure detector, and an emitter grounded, said pressure detector switching on said transistor when the suction pressure is below a predetermined value corresponding to the supercharged pressure limit.

12. An ignition timing control apparatus for an internal combustion engine according to claim 3 wherein:
said detector means comprises a pressure detector connected to a suction tube of said engine and said control means comprises a first transistor having a base connected to the output of said pressure detector, and an emitter grounded, and a first resistor connected between the collector of said first transistor and said integrator;
said integrator comprising an operational amplifier having an inverting input terminal connected via a second resistor to the collector of a second transistor, the base of which is connected to said comparator and the emitter of which is grounded, said inverting input terminal connected to the voltage dividing junction of a first voltage divider, a non-inverting input terminal connected to the voltage dividing junction of a second voltage divider and to said first resistor, and an output connected via a capacitor to said inverting input terminal, said pressure detector switching on said first transistor when the suction pressure is below a predetermined value corresponding to the supercharged pressure limit.

13. An ignition timing control apparatus for an internal combustion engine according to claim 3 wherein:
said detector means comprises a pressure detector connected to a suction tube of said engine and said control means comprises a switch connected between said integrator and said phase shifter and controlled by said pressure detector, said pressure detector switching off said switch when the suction pressure is below a predetermined value corresponding to the supercharged pressure limit.

14. An ignition timing control apparatus for an internal combustion engine according to claim 3 wherein:
said detector means comprises a pressure detector connected to a suction tube of said engine and said control means comprises a transfer swtich connected between said phase shifter and said switch means and having one transfer terminal connected to said generation means, said pressure detector causing said switch to connect said phase shift means to said switch means when the suction pressure is below a predetermined value corresponding to the supercharged pressure limit.

15. An ignition timing control apparatus for an internal combustion engine according to claim 3 wherein;
said detector means comprises a rotating speed detector of said engine connected to the output of said gate timing controller and said control means comprises a second switch means disposed between said rotating speed detector and said integrator to turn on or off in response to the output of said rotating speed detector;
said integrator comprises an operational amplifier having a first input connected to a reference voltage source activated by said comparator, a capacitor connected between said first input and the output of said operational amplifier, and means connected to the second input of said operational amplifier for reducing the charging current of said capacitor in response to the output of said second swiitch means.

16. An ignition timing control apparatus for an internal combustion engine according to claim 15 wherein:
said second swtich means comprises a transistor having a base connected to the output of said rotating speed detector, an emitter grounded, and a first resistor connected between the collector of said transistor and said integrator.

17. An ignition timing control apparatus for an internal combustion engine according to claim 16 wherein:
said first input of said operational amplifier comprises an inverting input connected via a second resistor to the collector of a second transistor, the base of which is connected to said comparator and the emitter of which is grounded, said inverting input connected to the voltage-dividing junction of a first voltage divider comprising said reference voltage source, and said second input of said operational amplifier comprising a non-inverting input connected to the voltage-dividing junction of a second voltage divider and to said first resistor for reducing the charging current of said capacitor in response to the output of said first resistor, said rotating speed detector switching on said first transistor when the rotating speed is below a predetermined value corresponding to a super charged pressure limit.

18. An ignition timing control apparatus for an internal combustion engine comprising:
an acceleration detector for detecting the vibrating acceleration of the internal combustion engine;
discriminating means for removing a noise signal component from the output of said acceleration sensor to discriminate a knocking signal component;
generation means for generating reference ignition timing signals;
phase shift means for phase-shifting the phase of said reference ignition timing signals in response to the output of said discriminating means;
switch means for switching the energization of an ignition coil in response to the output of said phase shift means; and
control means for controlling the phase shift variable of said reference ignition timing signals in response to a load condition of said engine;
wherein said discriminating means includes a frequency filter for passing therethrough a signal component of the output of said acceleration sensor of a frequency corresponding to the knocking of said engine, an analog gate connected to said frequency filter, a gate timing controller responsive to the output of said phase shift means to cause said analog gate to block noises of the output of said frequency filter which are obstructive in the detection of the knocking, a noise level detector responsive to the peak value of the output of said analog gate to provide as an output a DC voltage slightly higher than the peak value, and a comparator for comparing the output of said analog gate and said noise level detector to provide an output if the latter is higher than the former;
wherein said phase shift means includes an integrator which integrates the output of said comparator and a phase shifter for phase-shifting said reference ignition timing signal in response to the level of the integrated output of said integrator;
wherein said control means comprises a rotating speed detector of said engine connected to the output of said gate timing controller, and a second switch means disposed between said rotating speed detector and said integrator to turn on or off in response to the output of said rotating speed detector; and
wherein said integrator comprises an operational amplifier having a first input connected to a reference voltage source activated by said comparator, a capacitor connected between said first input and the output of said operational amplifier, and means connected to the second input of said operational amplifier for reducing the charging current of said capacitor in response to the output of said second switch means.

19. An ignition timing control apparatus for an internal combustion engine according to claim 18 wherein:
said second switch means comprises a transistor having a base connected to the output of said rotating speed detector, an emitter grounded, and a first resistor connected between the collector of said transistor and said integrator.

20. An ignition timing control apparatus for an internal combustion engine according to claim 19 wherein:
said first input of said operational amplifier comprises an inverting input connected via a second resistor to the collector of a second transistor, the base of which is connected to said comparator and the emitter of which is grounded, said inverting input connected to the voltage-dividing junction of a first voltage divider comprising said reference voltage source, and said second input of said operational amplifier comprising a non-inverting input connected to the voltage-dividing junction of a second voltage divider and to said first resistor for reducing the charging current of said capacitor in response to the output of said first resistor, said rotating speed detector switching on said first transistor when the rotating speed is below a predetermined value corresponding to a supercharged pressure limit.

* * * * *